United States Patent [19]

Barkalow et al.

[11] Patent Number: 5,330,772
[45] Date of Patent: Jul. 19, 1994

[54] USE OF GUM GUAIAC AS AN ANTIOXIDANT IN CHEWING GUM

[75] Inventors: David G. Barkalow, Deerfield; Jacara R. Muhammad, Chicago; Michael J. Greenberg, Northbrook, all of Ill.

[73] Assignee: Wm. Wrigley Jr. Company, Chicago, Ill.

[21] Appl. No.: 989,288

[22] Filed: Dec. 11, 1992

[51] Int. Cl.$^5$ .............................................. A23G 3/30
[52] U.S. Cl. .................................... 426/3; 426/541; 426/651
[58] Field of Search ........................... 426/3-6, 426/651, 541

[56] References Cited

U.S. PATENT DOCUMENTS

| | | | |
|---|---|---|---|
| 1,903,126 | 3/1933 | Newton et al. | 426/602 |
| 2,308,912 | 1/1943 | Doegey | 521/102 |
| 4,156,759 | 5/1979 | Hostettler | 426/515 |
| 4,197,327 | 4/1980 | Kawasaki et al. | 426/59 |
| 4,303,679 | 12/1981 | Raccach | 422/58 |
| 4,329,317 | 5/1982 | Detweiler et al. | 524/77 |
| 4,340,514 | 7/1982 | Housel | 422/58 |
| 4,382,064 | 5/1983 | Detweiler et al. | 422/58 |
| 4,425,327 | 1/1984 | Möller et al. | 424/65 |
| 4,559,234 | 12/1985 | Rubin et al. | 426/250 |
| 4,584,320 | 4/1986 | Rubin | 428/336 |
| 4,693,934 | 9/1987 | Nishimatsu et al. | 426/545 |
| 4,797,421 | 1/1989 | Ariga et al. | 424/405 |
| 4,834,977 | 5/1989 | Kohama et al. | 514/79 |
| 4,985,413 | 1/1991 | Kohama et al. | 426/3 |
| 5,139,796 | 8/1992 | Barkalow et al. | 426/3 |

OTHER PUBLICATIONS

Lawrence, Shu, and Harris, "Peppermint Oil Differentiation," *Perfumer & Flavorist*, 14:21 (Nov./Dec. 1989)].

*Primary Examiner*—Jeanette Hunter
*Attorney, Agent, or Firm*—Willian Brinks Hofer Gilson & Lione

[57] ABSTRACT

Mint flavoring compositions and wax-free gum bases are provided which are stabilized using gum guaiac, a naturally-occurring resin, as an antioxidant. Chewing gums containing stabilized mint flavoring compositions and wax-free gum bases are also provided.

19 Claims, 4 Drawing Sheets

CARYOPHYLLENE OXIDE
GUM GUAIAC (g.g.) AND TENOX GT-2
C. OXIDE (% OF TIME ZERO CONTROL)

USE OF GUM GUAIAC AS AN ANTIOXIDANT IN CHEWING GUM

RELATED PATENT APPLICATIONS

This application is a continuation-in-part application of PCT application, PCT/US92/06895, filed Aug. 14, 1992, the contents of which are hereby incorporated by reference.

FIELD OF THE INVENTION

The present invention relates to the use of gum guaiac as an antioxidant for mint flavorings and wax-free gum bases. The invention also relates to the use of gum guaiac as an antioxidant for mint-flavored chewing gums and chewing gums containing wax-free bases.

BACKGROUND OF THE INVENTION

Consumable items, including chewing gum, generally include ingredients which are subject to deterioration through oxidation. For example, gum bases and flavorings typically contain several components which readily oxidize. Although efforts have been undertaken to improve and optimize the stability of such ingredients, reformulation of the compositions to minimize oxidation can be very costly and time consuming.

Synthetic chemical compounds have previously been utilized as antioxidants for chewing gum bases and flavorings. Such synthetic antioxidants include Butylated Hydroxyanisole ("BHA"), Butylated Hydroxytoluene ("BHT"), and Tertiary Butyl Hydroquinone ("TBHQ").

Some naturally-occurring substances have also been reported to have antioxidant properties in various consumable items. For example, U.S. Pat. No. 5,139,796 discloses the use of certain mixtures of tocopherol homologs as an antioxidant for mint oils.

U.S. Pat. Noo 1,903,126 discloses a process for stabilizing oils and fats using gum guaiac. More particularly, the reference discloses the use of gum guaiac to stabilize oils and fats during storage, distribution, and manufacture of crackers and other bakery products.

U.S. Pat. No. 2,308,912 also discloses the use of gum guaiac to stabilize fats and fatty oils. This reference teaches that the gum guaiac may be quickly and efficiently incorporated, or dispersed, in the fat by use of a volatile fatty acid.

SUMMARY OF THE INVENTION

One embodiment of the invention provides a stabilized mint flavoring composition comprising at least one mint flavoring and gum guaiac, wherein said gum guaiac minimizes oxidation in said mint flavoring.

Another embodiment of the invention provides a method of stabilizing a mint flavoring composition comprising blending at least one mint flavoring with gum guaiac.

Another embodiment of the invention provides a mint-flavored chewing gum composition, comprising a water-soluble bulk portion, a water-insoluble chewing gum base, at least one mint flavoring, and a quantity of gum guaiac, wherein said gum guaiac minimizes oxidation in said mint flavoring.

Another embodiment of the invention provides a method of preparing a mint-flavored chewing gum, comprising the steps of providing gum ingredients comprising gum base, softener, sweetener, and at least one mint flavoring, providing gum guaiac, and mixing the gum ingredients with the gum guaiac so that the gum guaiac comprises about 2 ppm to about 700 ppm of the chewing gum.

Another embodiment of the invention provides a stabilized gum base composition comprising a wax-free gum base and gum guaiac, wherein said gum guaiac minimizes oxidation in said gum base.

Another embodiment of the invention provides a chewing gum composition, comprising a water soluble bulk portion, at least one flavoring, a wax-free gum base, and a quantity of gum guaiac, wherein said gum guaiac minimizes oxidation in said gum base.

A further embodiment of the invention provides a method of preparing a chewing gum, comprising the steps of providing gum ingredients comprising wax-free gum base, softener, and sweetener, providing gum guaiac, and mixing the gum guaiac with the gum ingredients so that the gum guaiac comprises about 2 ppm to about 700 ppm of the chewing gum.

The present invention is advantageous in that it stabilizes mint flavorings and wax-free gum bases by adding a naturally-occurring substance. Further, when used in the amounts disclosed in the present invention, gum guaiac exhibits no adverse affects on the true flavor characteristics of mint flavorings. These advantages are provided by a relatively simple and quick method. In particular, the invention can be carried out in simple and inexpensive equipment. The invention is also well suited for batch processing.

The above-described advantages of the present invention, as well as others, will become apparent from the following description which discloses presently preferred embodiments.

DETAILED DESCRIPTION OF THE PRESENTLY PREFERRED EMBODIMENTS

Figure 1:
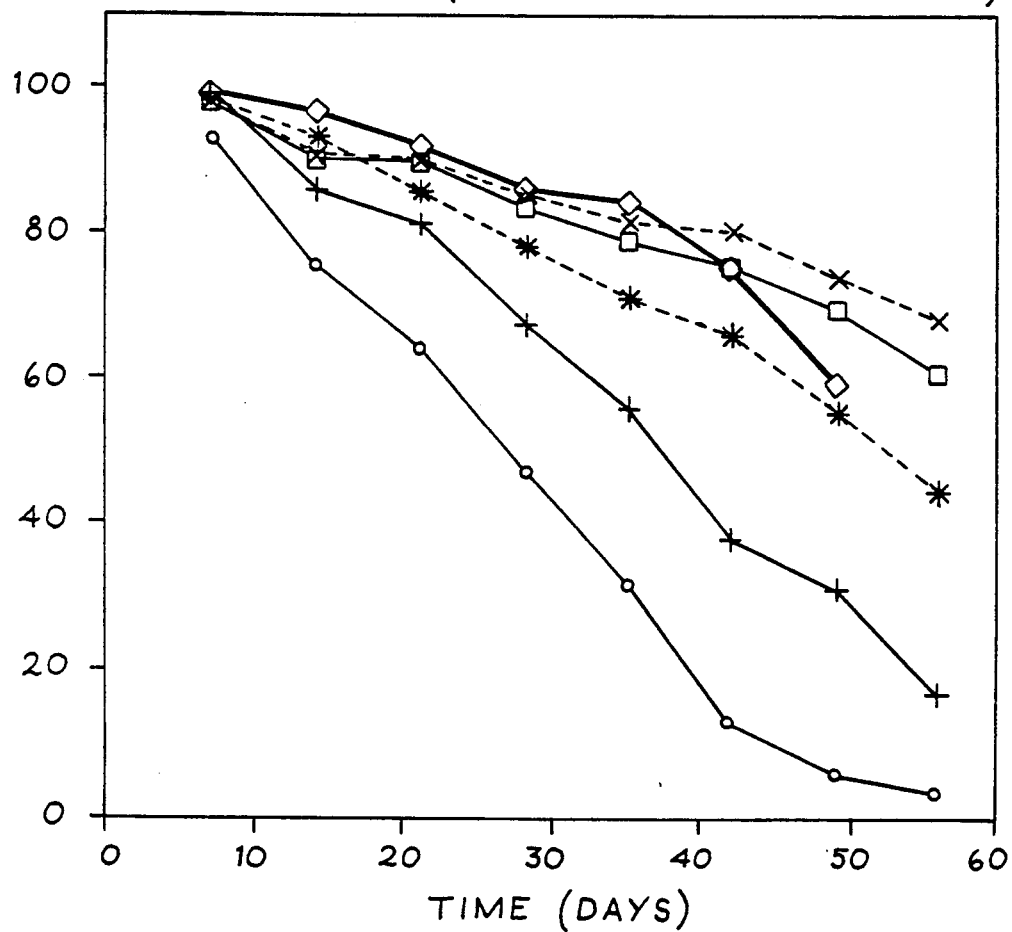
FIG. 1 shows a comparison of antioxidant activity for varying concentrations of gum guaiac and 0.1% Tenox GT-2. Oxidation was measured by gas chromatography as a function of the decrease in alpha-terpinene concentrations over time.

The present invention relates to methods and compositions wherein mint flavorings and wax-free gum bases are stabilized by using gum guaiac as an antioxidant. The term "gum guaiac" as used in the present invention refers to a substance that is usually obtained from the wood of trees. Gum guaiac can be obtained from *Guaiacum santum* L. and *Guaiacum officinale* L. trees, such trees being commonly found in Mexico and the West Indies. Gum guaiac is also commercially available, and may be purchased from commercial vendors such as Madis Botanical Derivatives, Hackensack, N.J. The present invention contemplates that gum guaiac may be used in its native form which is generally characterized as a resin, or in any chemically purified form which has antioxidant activity.

One embodiment of the invention relates to a stabilized mint flavoring composition. Mint flavorings contemplated by the present invention include, but are not limited to, peppermint oil, spearmint oil, corn mint oil, Scotch spearmint oil, and oil of wintergreen, or blends thereof. Mint flavorings, particularly mint oils like peppermint oil, contain several components which are readily susceptible to oxidation. Such components in peppermint oil include alpha-terpinene, gamma-terpinene, 3-octanol, and cis-ocimene. [See, e.g., Shu and Harris, "Peppermint Oil Differentiation," *Perfumer & Flavorist*, 14:21 (Nov./Dec. 1989)]. Other mint flavorings also contain many of the oxidizable components that are present in peppermint oil. For instance, spearmint oil and Scotch spearmint oil contain alpha-pinene, limonene, 3-octanol, and beta-pinene along with other components. Corn mint oil contains alpha-pinene, myrcene, limonene, gamma-terpinene, 3-octanol, menthofuran, beta caryophyllene, germacrene D, and beta-pinene along with other components.

Gum guaiac may be added to the mint flavoring in its native, resinous form. Alternatively, the gum guaiac may be dissolved in a suitable solvent prior to being added to the mint flavoring. One suitable solvent for gum guaiac is alcohol. Since gum guaiac in its native form is a relatively viscous resin, it may be desirable, although not necessary, to dissolve the gum guaiac in a solvent prior to being added to the mint flavoring.

The gum guaiac is then blended with the mint flavoring for a sufficient time so that the gum guaiac completely dissolves in the mint flavoring and a homogeneous mixture is formed. If gum guaiac, in its native resinous form, is blended with the mint flavoring, the mixture should be blended for at least 5 minutes or until a homogenous mixture is visually observed. The gum guaiac and mint flavoring can be blended in any type of vessel, such as a mixing bowl, large barrel or tote, and can be blended at ambient temperature or at slightly elevated temperatures. However, the temperature should not be too high since an extreme temperature (above about 30° C.) will tend to cause the mint flavoring to lose volatile flavor notes. Preferably, the gum guaiac and mint flavoring are blended at room temperature.

The amount of gum guaiac added to the mint flavoring may vary depending on the specific mint flavoring to be stabilized. Generally, more gum guaiac is added when the mint flavoring is to be used in a chewing gum since some of the gum guaiac may migrate from the mint flavoring into the other ingredients in the gum. Those persons skilled in the art will be able to optimize the concentration of gum guaiac in the mint flavoring without undue experimentation. Preferably, the amount of gum guaiac added to the mint flavoring is about 0.2% to about 0.7% by weight of the mint flavoring. More preferably, the amount of gum guaiac added to the mint flavoring is about 0.3% to about 0.5%, and most preferably, about 0.4%. Although it was previously believed that gum guaiac causes off-notes in mint flavorings, Applicants surprisingly found that such off-notes are not created when gum guaiac is used at such levels and that gum guaiac does not disturb the true mint characteristics when the gum guaiac is present at or below the 0.4% level.

The gum guaiac can be added to the mint flavoring as the sole antioxidant for the flavoring, or it can be added in combination with other natural antioxidants. Other natural antioxidants added to the mint flavoring should be added in amounts which do not adversely affect the mint flavoring.

The effectiveness of gum guaiac in minimizing oxidation in mint oil, particularly peppermint oil, is described further in Example 1 below. Antioxidant activity was evaluated by gas chromatography and monitoring concentrations of alpha-terpinene, gamma-terpinene, para-cymene ("p-cymene"), and caryophyllene oxide components. As oxidation occurs, alpha- and gamma-terpinene oxidize to form para-cymene. Caryophyllene oxide is also formed as oxidation occurs. The degree of oxidation taking place in the mint oil can thus be measured by the increase in concentration of para-cymene and caryophyllene oxide components in the sample and the reduction in concentrations of alpha- and gamma-terpinene.

In one embodiment of the invention, the stabilized mint flavoring composition comprising gum guaiac is incorporated in a chewing gum formulation. The stabilized mint flavoring composition comprising gum guaiac can also be added to a bubble gum formulation. In general, a chewing gum comprises a water-soluble bulk portion, a water-insoluble chewable gum base portion, and typically, water-insoluble flavor ingredients. The water-soluble portion dissipates with a portion of the flavor over time during chewing. The gum base portion is retained in the mouth throughout the chew.

The insoluble gum base portion generally comprises elastomers, resins, fats and oils, softeners and inorganic fillers. The insoluble gum base constitutes between about 5% to about 95% by weight of the gum, and more preferably, about 20% to about 30% by weight of the gum. Elastomers may include polyisobutylene, isobutylene-isoprene copolymer, styrene butadiene rubber, as well as natural latexes such as chicle. Resins include polyvinyl acetate and terpene resins. Low molecular weight polyvinyl acetate is a preferred resin. Fats and oils may also be included in the gum base including tallow, vegetable oils such as soybean and cottonseed oils, hydrogenated and partially hydrogenated vegetable oils, and cocoa butter.

The insoluble gum base may also comprise one or more waxes. Commonly employed waxes include paraffin, microcrystalline, and natural waxes such as beeswax, candellia and carnauba, and polyethylene wax. Preferably, the waxes have a melting point of about 95° F. to about 240° F. Alternatively, the gum base may be a wax-free base, as described further below.

The gum base typically also includes a filler component. The filler component may be calcium carbonate, magnesium carbonate, talc, dicalcium phosphate, and the like. The filler may constitute between about 5% to about 60% of the gum base. Preferably, the filler component comprises about 5% to about 50% of the chewing gum base. The gum base also contains softeners, including glycerol monostearate and glycerol triacetate. Further, gum bases may also contain additional ingredients such as colors and emulsifiers.

The water-soluble portion of the chewing gum may further comprise softeners, bulk sweeteners, high intensity sweeteners, and flavors, and combinations thereof. The softeners are added to the chewing gum in order to optimize the chewing ability and mouth feel of the gum. Softeners, also known in the art as plasticizers or plasticizing agents, generally constitute about 0.1% to about 15% by weight of the gum. Softeners contemplated by the invention include glycerin, lecithin, and combinations thereof. Aqueous sweetener solutions such as those containing sorbitol, hydrogenated starch hydrolysates, corn syrup, and combinations thereof may be used as softeners and binding agents in the gum.

Bulk sweeteners contemplated by the present invention include both sugar and sugarless components and may constitute about 20% to about 80% by weight of the chewing gum. Sugar sweeteners generally include saccharide-containing components commonly known in the art and include, but are not limited to, sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol, and the like, alone, or in any combination.

High intensity sweeteners may also be added to the chewing gum. High intensity sweeteners are known in the art and include, but are not limited to, aspartame, Sucralose®, cyclamate, acesulfame-K, dihydrochalones, alitame, saccharin, thaumatin, monellin, and the like, alone or in combination.

Those persons skilled in the art will recognize that any combination of sugar/sugarless sweeteners may be employed in the chewing gum. Further, those persons skilled in the art will recognize a sweetener may be present in a chewing gum in whole or in part as a water-soluble bulking agent, and that the softener may be combined with a sweetener such as an aqueous sweetener solution.

The stabilized mint flavoring composition comprising gum guaiac may be added to the gum formulation in an amount from about 0.1% to about 10% by weight of the chewing gum, and preferably, from about 0.5% to about 3% by weight of the chewing gum. The amount of gum guaiac in the chewing gum is about 2 ppm to about 700 ppm based on the weight of the chewing gum. Preferably, the amount of gum guaiac in the chewing gum is about 10 ppm to about 500 ppm and most preferably, about 20 ppm to about 200 ppm based on the weight of the chewing gum. When the stabilized mint flavoring composition is used in chewing gum, it is preferred that the gum guaiac be preblended with the mint flavoring. Alternatively, the gum guaiac may be mixed into the chewing gum ingredients along with the mint flavoring. The gum guaiac should be thoroughly blended with the chewing gum ingredients to produce a homogeneous mixture. The stabilized mint flavoring composition comprising gum guaiac may also be blended with other flavors such as essential oils, synthetic flavors, or mixtures thereof, including but not limited to, oils derived from plants and fruits such as citrus oils, fruit essences, clove oil, anise and the like. Artificial flavoring components are also contemplated. Those skilled in the art will recognize that natural and artificial flavoring agents may be combined in any sensorially acceptable blend. All such flavors and flavor blends are contemplated by the present invention.

Ingredients such as colors, emulsifiers, and pharmaceutical agents may also be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks or casting into pellets. Generally, the ingredients are mixed by first melting the gum base and adding it to the running mixer. The base may also be melted in the mixer itself. Color may also be added at this time. A softener such as glycerin may then be added next along with the syrup and a portion of the bulking agent. Further portions of the bulking agents may be added to the mixer. Preferably, the mint flavoring composition comprising gum guaiac is added to the mixture near the end of the mixing process. The entire mixing procedure takes from about 5 minutes to about 15 minutes, however, longer mixing times may be required. Those persons skilled in the art will recognize that many variations of the above-described procedure may be followed.

In another embodiment of the invention, there is provided a stabilized wax-free gum base comprising gum guaiac. The wax-free gum base may include the elastomers, resins, fats and oils, softeners and inorganic fillers described in connection with the gum bases above. The wax-free gum base compositions of the invention do not include wax components.

The amount of gum guaiac added to the wax-free gum base may vary depending on the specific components added to the base. Those persons skilled in the art will be able to optimize the concentration of gum guaiac in the gum base without undue experimentation. Preferably, the amount of gum guaiac added to the wax-free gum base is about 0.2% to about 0.7% by weight of the gum base. More preferably, the amount of gum guaiac added to the gum base is about 0.3% to about 0.5%, and most preferably, about 0.4%. An example of a wax-free gum base formulation is provided in Example 5.

Prior to adding the gum guaiac to the wax-free gum base, the individual base components can be softened. The gum guaiac can then be added to the presoftened base components and blended. The blend can be added to the remaining base components to make the finished base. Alternatively, the gum guaiac can be mixed first with one of the base components, and the mixture can then be used in making a gum base. For example, the gum guaiac can be mixed first with the fat ingredient in the base.

The stabilized wax-free gum base comprising gum guaiac can also be incorporated into chewing gum formulations as described above.

EXAMPLES

Example 1

Laboratory tests were performed to determine the effectiveness of gum guaiac as an antioxidant for peppermint oil. First, 250 ml peppermint oil was placed in each of six glass jars (1 pint volume). Different amounts of gum guaiac were then added to five of the jars containing peppermint oil so that the five samples included 0.05%, 0.1%, 0.2%, 0.4%, and 0.6% by weight gum guaiac, respectively. As a control, Tenox GT-2, a known antioxidant consisting of alpha tocopherol, gamma tocopherol, and delta tocopherol in a soybean oil diluent, was added to the sixth jar to a concentration of 0.1% by weight. Tenox GT-2 was purchased from Eastman Chemical Company. The samples in each jar were covered and then stirred for 45 minutes at room temperature.

All six glass jars were then placed in Parr reaction vessels equipped with 1,000 psi gauges, pressurized to 100 psi with oxygen, and put in an 85° F. oven. The pressurized vessels were stored in the oven for a total of 56 days. At 7, 14, 21, 28, 35, 42, and 49 days, a sample of peppermint oil was withdrawn from each vessel and analyzed by gas chromatography. The results of the gas chromatography analysis are shown in FIGS. 1-4 of the present application.

Alpha-terpinene and gamma-terpinene are oxidizable components that are depleted over time. Para-cymene is the oxidation product of alpha- and gamma-terpinene that increases in concentration as an oxidation product. Caryophyllene oxide also increases in concentration over time as an oxidation product. Oxidation activity was therefore measured by the increase in concentration of the oxidation products, para-cymene and caryophyllene oxide, and the decrease in oxidizable components, alpha-terpinene and gamma-terpinene.

Figure 2:
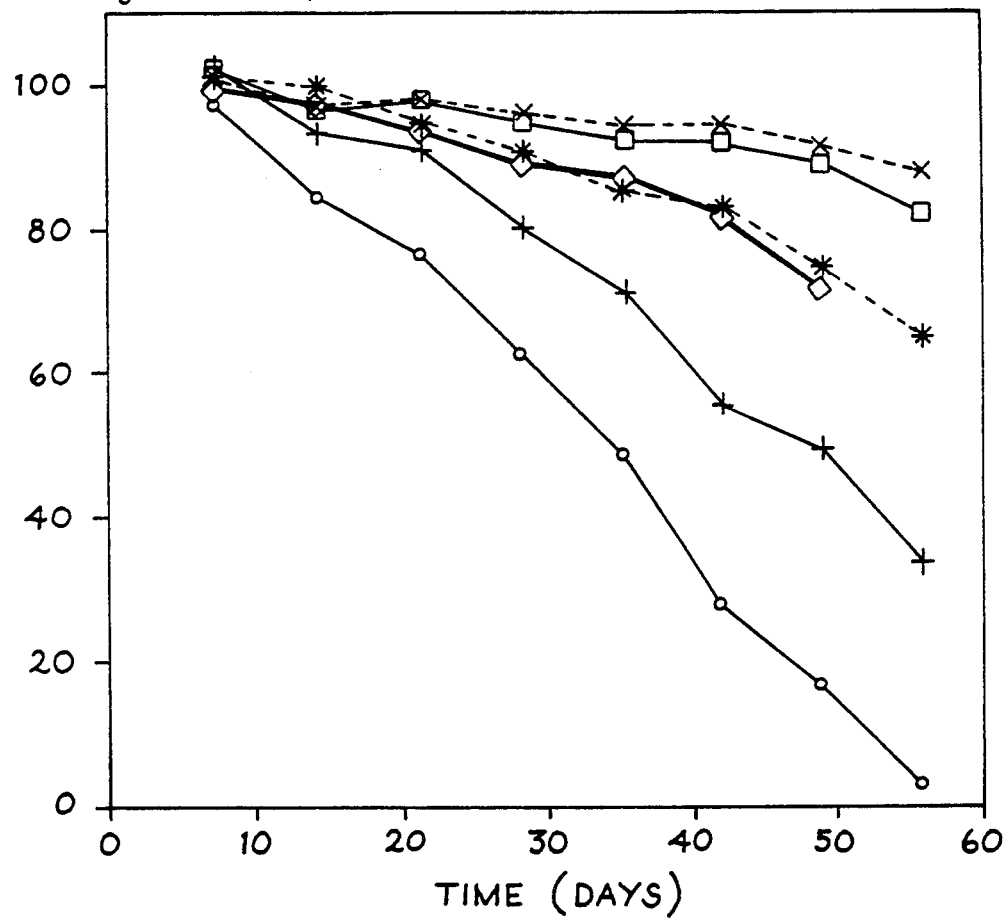
FIG. 2 shows a comparison of antioxidant activity for varying concentrations of gum guaiac and 0.1% Tenox GT-2. Oxidation was measured by gas chromatography as a function of the decrease in gamma-terpinene concentrations over time.

FIGS. 1 and 2 compare the effects of Tenox GT-2 and several concentrations of gum guaiac on levels of alpha-terpinene and gamma-terpinine in peppermint oil over a period of 56 days. Unexpectedly, at 0.4% and 0.6% concentrations in mint oil, gum guaiac had superior antioxidant effects as compared to Tenox GT-2.

Figure 3:
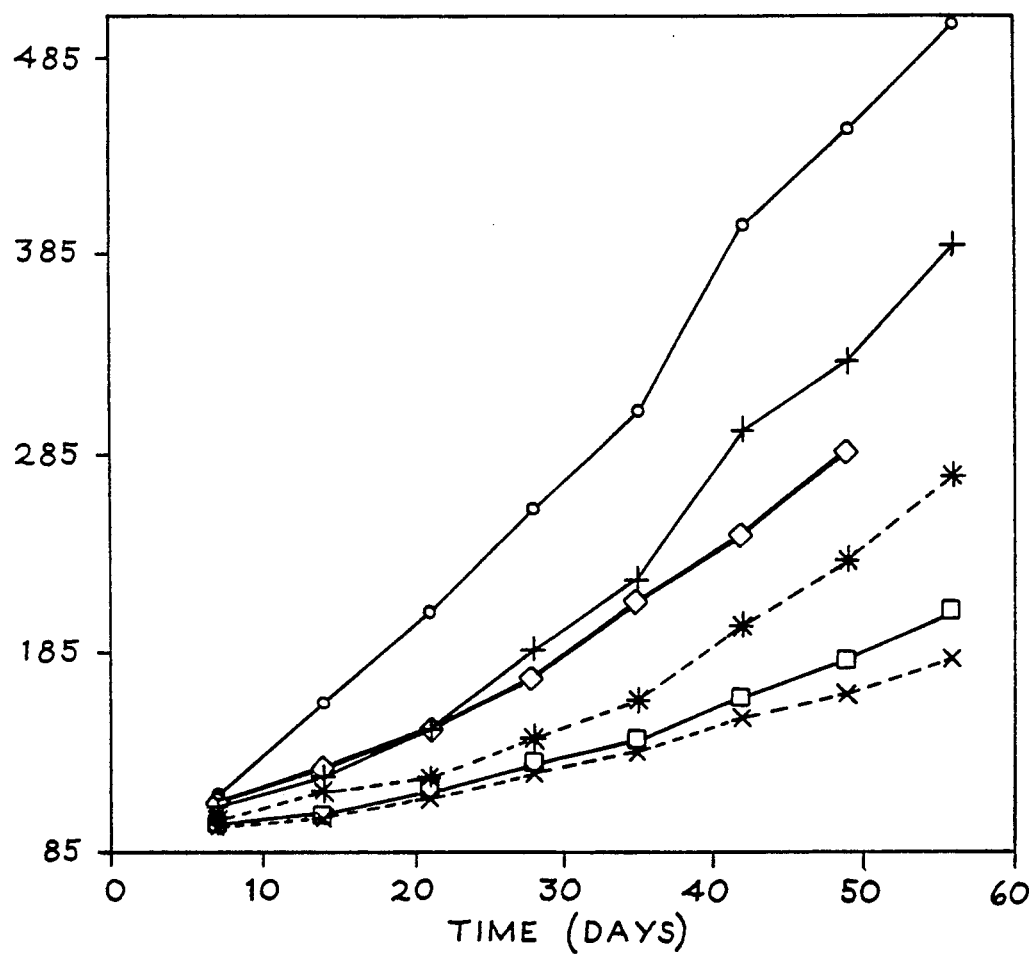
FIG. 3 shows a comparison of antioxidant activity for varying concentrations of gum guaiac and 0.1% Tenox GT-2. Oxidation was measured by gas chromatography as a function of the increase in p-cymene concentrations over time.
Figure 4:
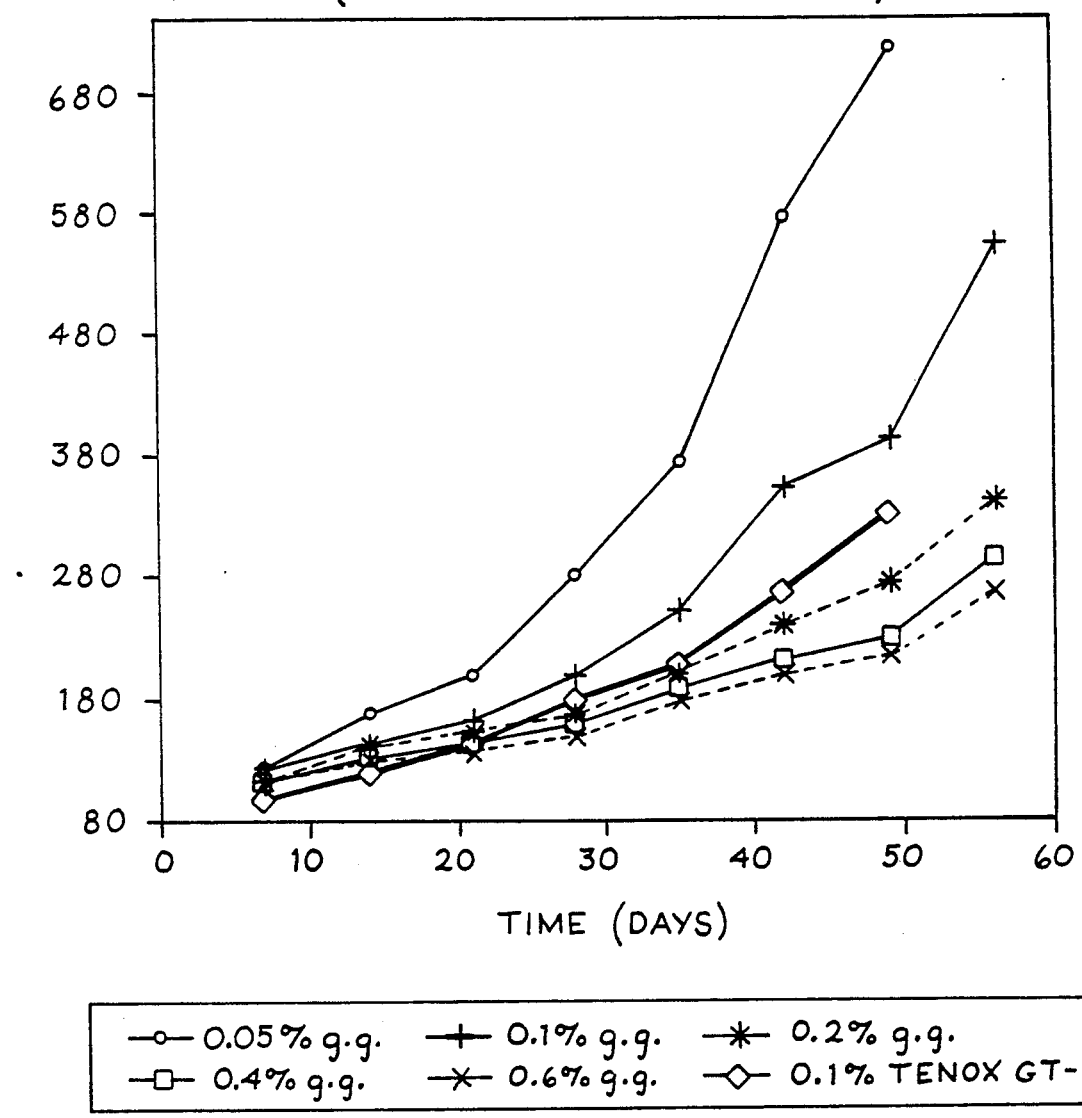
FIG. 4 shows a comparison of antioxidant activity for varying concentrations of gum guaiac and 0.1% Tenox GT-2. Oxidation was measured by gas chromatography as a function of the increase in caryophyllene oxide concentrations over time.

As shown in FIGS. 3 and 4, at 0.4% and 0.6% concentrations in mint oil, gum guaiac also had superior activity in minimizing concentrations of para-cymene and caryophyllene oxide.

Example 2

Chewing gum containing gum guaiac was also evaluated by sensory testing. Two chewing gum formulations, as shown in Table 1 below, were prepared and evaluated.

TABLE 1

|  | Gum A | Gum B |
|---|---|---|
| Sugar | 55.34 | 55.3364 |
| Base | 19.68 | 19.68 |
| Corn Syrup | 12.65 | 12.65 |
| Dextrose | 9.9 | 9.9 |
| Glycerin | 1.28 | 1.28 |
| Hydroxylated Lecithin | 0.25 | 0.25 |
| Peppermint Flavor | 0.90 | — |
| Peppermint Flavor/ 0.4% gum guaiac | — | 0.9036 |
|  | 100.0% | 100.0% |

Gum A was prepared containing the ingredients listed in Table 1. Gum B was prepared by preblending gum guaiac wood oil resin (Madis Botanical Derivatives, Hackensack, N.J.) with peppermint oil at 0.4% by weight of the oil. The gum guaiac and mint flavoring were blended for 5 minutes at room temperature. The mixture was then added to the "Gum B" chewing gum formulation listed in Table 1.

Samples of Gums A and B were then evaluated by trained panelists for sensory testing. The panelists determined that Gum B samples containing 0.4% gum guaiac in the peppermint oil were at parity with Gum A samples that did not contain gum guaiac. No undesirable off-notes were detected in Gum B.

Example 3

The gum formulation below is a sugarless chewing gum formulation in which a stabilized mint flavoring composition comprising gum guaiac can be added.

| Sorbitol | 50.0 |
|---|---|
| Gum Base | 24.7 |
| Mannitol | 9.38 |
| Glycerin | 2.0 |
| Aspartame | 0.30 |
| Liquid Sorbitol | 12.0 |
| Lecithin | 0.18 |
| Mint Flavoring/gum guaiac | 1.44 |
|  | 100.0% |

The gum can be prepared according to the procedure described above in the application.

Example 4

The gum formulation below is a bubble gum formulation in which stabilized mint flavoring composition comprising gum guaiac can be added.

| Sugar | 55.7 |
|---|---|
| Gum Base | 24.02 |
| Corn Syrup | 17.68 |
| Glycerin | 1.74 |
| Lecithin | 0.60 |
| Mint Flavoring/gum guaiac | 0.80 |
|  | 100.0% |

The gum can be prepared according to the procedure described above in the application.

Example 5

A wax-free gum base is prepared using the following formulation of ingredients.

| Natural gum | 22.2 |
|---|---|
| Butyl (isoprene-isobutylene) elastomer | 5.7 |
| Polyisobutylene elastomer | 3.0 |
| Polyvinyl acetate | 22.0 |
| Glycerol esters of partially hydrogenated resin | 15.2 |
| Calcium carbonate | 11.4 |
| Hydrogenated vegetable oil/gum guaiac | 17.2 |
| Glycerol monostearate | 3.3 |
|  | 100.0% |

The wax-free base is then incorporated into the gum formulation below.

| Sugar | 62.66 |
|---|---|
| Wax-free base | 20.08 |
| Corn Syrup | 15.40 |
| Glycerine | 1.0 |
| Flavoring | 0.86 |
|  | 100.0% |

The gum can be prepared according to the procedure described above in the application.

Although specific embodiments and examples have been described herein, it should be born in mind that these have been provided by way of explanation and illustration and that the present invention is not limited thereby. Modifications which are within the ordinary skill in the art to make are considered to lie within the scope of the invention as defined by the following claims, including all equivalents.

We claim:

1. A stabilized mint flavoring composition comprising at least one mint flavoring and gum guaiac, wherein said gum guaiac minimizes oxidation in said mint flavoring.

2. The composition of claim 1 wherein said gum guaiac is about 0.2% to about 0.7% by weight of the mint flavoring composition.

3. The composition of claim 1 wherein said at least one mint flavoring is selected from the group consisting of peppermint oil, spearmint oil, corn mint oil, Scotch spearmint oil, oil of wintergreen, and blends thereof.

4. A method of stabilizing a mint flavoring composition comprising blending at least one mint flavoring with gum guaiac.

5. A mint-flavored chewing gum composition, comprising:
   a water-soluble bulk portion;
   a water-insoluble chewing gum base;
   at least one mint flavoring; and
   a quantity of gum guaiac, wherein said gum guaiac minimizes oxidation in said mint flavoring in the chewing gum.

6. The chewing gum of claim 5 wherein said gum is a sugarless gum.

7. The chewing gum of claim 5 wherein said gum is a bubble gum.

8. The chewing gum of claim 5 wherein said at least one mint flavoring is selected from the group consisting of peppermint oil, spearmint oil, corn mint oil, Scotch spearmint oil, oil of wintergreen, and blends thereof.

9. A method of preparing a mint-flavored chewing gum, comprising the steps of:
   providing gum ingredients, comprising gum base, softener, sweetener, and at least one mint flavoring;
   providing gum guaiac; and
   mixing the gum ingredients with the gum guaiac so that the gum guaiac comprises about 2 ppm to about 700 ppm of the chewing gum.

10. The method of claim 9 wherein said gum guaiac is blended with said mint flavoring before said mint flavoring is mixed with the gum ingredients.

11. The method of claim 10 wherein the gum guaiac comprises about 0.2% to about 0.7% by weight of said mint flavoring.

12. The method of claim 9 wherein the mint flavoring comprises about 0.1% to about 10% by weight of the chewing gum.

13. A stabilized gum base composition comprising a wax-free gum base and gum guaiac, wherein said gum guaiac minimizes oxidation in said gum base.

14. The composition of claim 13 wherein said gum guaiac is about 0.2% to about 0.7% by weight of the gum base composition.

15. A chewing gum composition, comprising:
   a water-soluble bulk portion;
   at least one flavoring;
   a wax-free gum base; and
   a quantity of gum guaiac, wherein said gum guaiac minimizes oxidation in said gum base in the chewing gum.

16. A method of preparing a chewing gum, comprising the steps of:
   providing gum ingredients, comprising a wax-free gum base, softener, and sweetener;
   providing gum guaiac; and
   mixing the gum ingredients with the gum guaiac so that the gum guaiac comprises about 2 ppm to about 700 ppm of the chewing gum.

17. The method of claim 16 wherein said gum guaiac is blended with said wax-free gum base before said gum base is mixed with the gum ingredients.

18. The method of claim 16 wherein the wax-free gum base comprises about 20% to about 30% by weight of the chewing gum.

19. The method of claim 17 wherein the gum guaiac comprises about 0.2% to about 0.7% by weight of said gum base.

* * * * *

UNITED STATES PATENT AND TRADEMARK OFFICE
CERTIFICATE OF CORRECTION

PATENT NO. : 5,330,772
DATED : July 19, 1994
INVENTOR(S) : David G. Barkalow et al.

It is certified that error appears in the above-indentified patent and that said Letters Patent is hereby corrected as shown below:

<u>On the Title Page</u>

Please add the following information after item [22]

--[62] Related Foreign Application Data
    Continuation-in-Part of PCT/US92/06895, August 14, 1992--

Signed and Sealed this

Twenty-seventh Day of May, 1997

Attest:

BRUCE LEHMAN

*Attesting Officer*      *Commissioner of Patents and Trademarks*